(12) United States Patent
Amaya et al.

(10) Patent No.: US 8,469,691 B2
(45) Date of Patent: Jun. 25, 2013

(54) APPARATUS FOR PRODUCING THREE-DIMENSIONAL SHAPED PRODUCT

(75) Inventors: Koichi Amaya, Fukui (JP); Yukinori Urushizaki, Fukui (JP); Hideto Matsubara, Fukui (JP)

(73) Assignee: Matsuura Machinery Corporation, Fukui-shi, Fukui (JP)

( * ) Notice: Subject to any disclaimer, the term of this patent is extended or adjusted under 35 U.S.C. 154(b) by 463 days.

(21) Appl. No.: 12/836,135

(22) Filed: Jul. 14, 2010

(65) Prior Publication Data

US 2011/0256252 A1   Oct. 20, 2011

(30) Foreign Application Priority Data

Apr. 14, 2010   (JP) ................. 2010-092870

(51) Int. Cl.
*B29C 35/08* (2006.01)
*B29C 41/02* (2006.01)

(52) U.S. Cl.
USPC ....................... 425/375; 425/174.4

(58) Field of Classification Search
USPC .............. 425/174.4, 174.2, 78, 405.1, 405.2, 425/470, 375; 700/120
See application file for complete search history.

(56) References Cited

U.S. PATENT DOCUMENTS

| 3,530,210 A * | 9/1970 | Patton ............................ 419/69 |
| 5,658,412 A | 8/1997 | Retallick et al. |
| 5,753,274 A | 5/1998 | Wilkening et al. |
| 2010/0155985 A1 * | 6/2010 | McAlea et al. ............ 425/174.4 |

FOREIGN PATENT DOCUMENTS

| JP | 4-255327 A | 9/1992 |
| JP | 7-501765 A | 2/1995 |
| JP | 8-281807 A | 10/1996 |

* cited by examiner

*Primary Examiner* — Richard Crispino
*Assistant Examiner* — Thukhanh Nguyen
(74) *Attorney, Agent, or Firm* — Richard M. Goldberg

(57) ABSTRACT

An apparatus for producing a three-dimensional shaped product installs on a surface of a table a base plate which loads powder and a shaped article, with a vertical space being formed. A frame body is installed upright on the table. The base plate is placed on a support horizontally projecting from the frame body and/or a step portion which provides an inner direction part of the table of the frame body. The base plate is supported so the center of gravity of the base plate is inside a triangle formed by three locations or a quadruple formed by four locations inside a region of the support or the step portion on which the base plate is placed, and the part projecting above the support and/or an inner wall of the frame body are contacted with a horizontally surrounding part of the base plate at three or more locations.

19 Claims, 13 Drawing Sheets

FIG. 1(d)

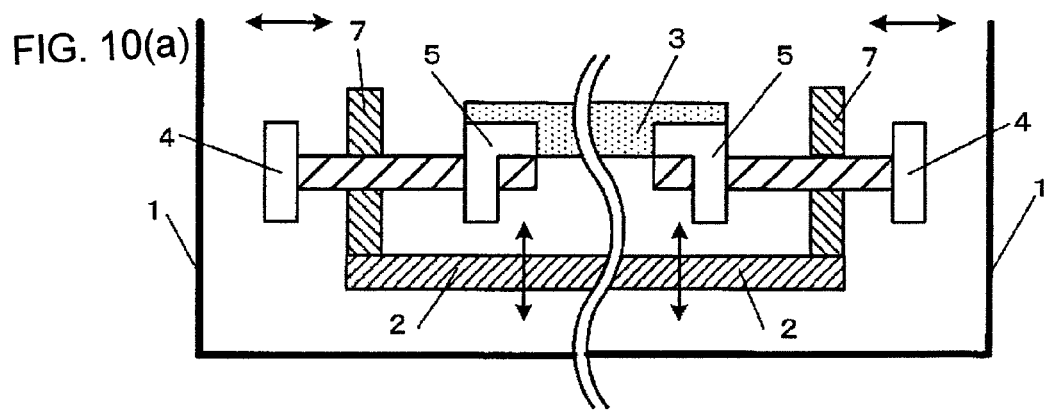
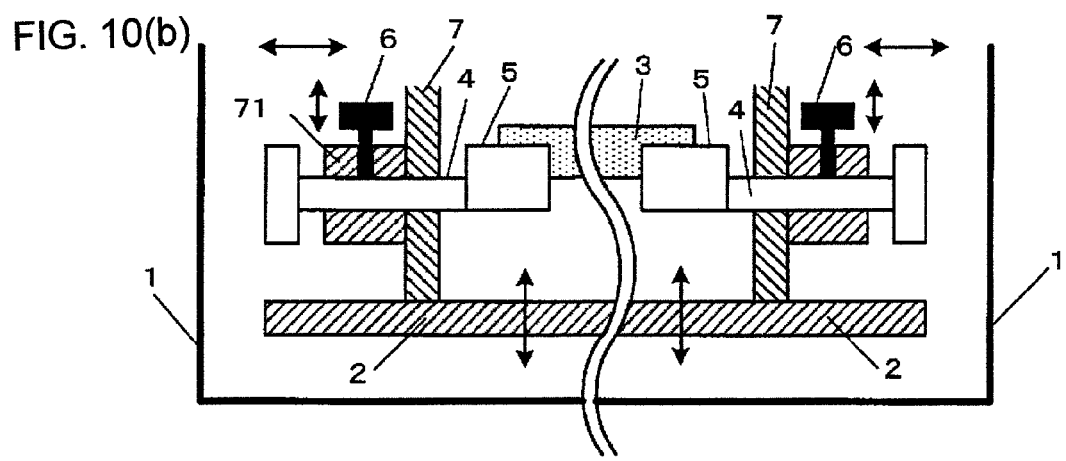

APPARATUS FOR PRODUCING THREE-DIMENSIONAL SHAPED PRODUCT

FIELD OF THE INVENTION

The present invention relates to an apparatus for producing a three-dimensional shaped product in which metal powder or non-metal powder loaded on a vertically movable table is laminated while being sintered by irradiating electromagnetic waves to each layer, thereby producing a predetermined three-dimensional shaped product.

DESCRIPTION OF THE RELATED ART

There have been proposed various configurations in technical fields where metal powder or non-metal powder is sintered by irradiation of electromagnetic waves such as laser beams or electron beams, thereby molding a three-dimensional shaped product. However, any configuration will always entail the following steps:
(a) a planarization step for spraying powder by allowing the powder to fall and sliding on the upper-side surface or in the vicinity of the thus sprayed powder,
(b) a step in which a region to be shaped is irradiated by electromagnetic waves such as laser beams or electron beams, thereby sintering the irradiated region, and
(c) a step in which the end part and/or the upper surface that have been sintered in the step (b) are cut with a rotating tool, thereby molding the end part and/or the upper surface, and the steps of (a), (b) and (c) are repeated to finally mold a necessary three-dimensional shape.

Where the step (c) is completed for a specific powder layer, the powder on or around an object to be shaped is decreased in height only by one layer and the step (a) is resumed on a next powder layer.

Therefore, the table which loads the powder is installed so as to move vertically.

Where a powder layer located at the lowest level is brought directly into contact with the upper surface of the table, the powder layer adheres to the upper surface of the table in the sintering step (b). Thereby, it is impossible to smoothly remove from the table an object which has been completely shaped.

In order to cope with the above situation, Patent Document 1 has adopted a configuration in which when powder is solidified by sintering ordinarily on the surface of a table (which is expressed as "support means 2" in Patent Document 1), a base plate is installed which is made by selecting a material adherable to the powder.

Ordinarily, an existing shaped part is influenced by the movement of a planarization apparatus in the step (a). Therefore, in order for the shaped part to be prevented from moving in a direction in which the apparatus moves, it is necessary that the base plate is kept stable on the surface of the table.

Due to the above-described necessity, in the configuration of Patent Document 1, the base plate is fixed by inserting a bolt through the table from below.

However, where the base plate is fixed to the table by using a support, thermal energy resulting from irradiation of electromagnetic waves or electron beams is dispersed by thermal conduction via the base plate and the table. Thereby, some trouble may take place in a case where powder is adhered to the base plate with a predetermined strength.

Further, it is troublesome to fix the table by inserting the bolt from below, and where the base plate is also integrally configured with the lower end part of a shaped object, there is inevitably found such an inconvenience that a bolt insertion hole remains.

Patent Document 1: Japanese Patent No. 4054075

DISCLOSURE OF THE INVENTION

Problems to be Solved by the Invention

An object of the present invention is to provide an apparatus for producing a three-dimensional shaped product in which a base plate is interposed between a portion which is a region to be sintered among individual powder layers and a table, more particularly, to provide a configuration of the apparatus for producing a three-dimensional shaped product in which the base plate is installed so as to give a vertical space between the table and the base plate and also a necessity is eliminated for inserting a bolt through the surface of the base plate from the table side.

In order to attain the above object, the present invention provides a basic configuration of an apparatus for producing a three-dimensional shaped product in which the following steps are sequentially repeated:

spraying one of a metallic and non-metallic powder on a surface of a base plate placed on an upper side of a vertically movable table in a shaping tank and having on the surface at least a material which can be adhered to the metallic or non-metallic powder upon solidification of the powder adjacent to the upper side by sintering and on the upper side of the table, subjecting an upper-side surface of the thus sprayed powder to planarization, irradiating one of electromagnetic waves and electron beams along a layer having a predetermined thickness to a region to be shaped which is located at an uppermost position, thereby forming a sintered layer, and cutting at least one of an end part and upper surface where sintering has been performed to effect molding, wherein the apparatus comprises:
a frame body installed upright on the table,
the base plate placed on a support projecting horizontally from at least one of the frame body and a step portion which serves as a lower part of the frame body situated at a side of the table on the frame body,
the base plate adapted to be supported by an arrangement so that a center of gravity of the base plate is present inside one of:
a triangle formed by three locations and
a quadrangle formed by four locations inside a region of at least one of the support and the step portion on which the back surface of the base plate is supported, and
a projected part which projects at least above toward upside from the support and an inner wall of the frame body in contact with which a horizontally surrounding part of the base plate is contacted, and there is reliably realized at a region to be contacted such a situation that any one of crossing angles formed by individual normal lines from three or more contact locations of the triangle or quadrangle adjacent to each other is smaller than 180 degrees, thereby preventing the base plate from moving horizontally.

BRIEF DESCRIPTION OF THE DRAWINGS

FIGS. 5(a) and (b) show cases where circular base plates are respectively placed on two and three supports and also two and three projected parts are respectively contacted with horizontally surrounding parts. Further, FIGS. 5(c) and (d) show cases where rectangular base plates are respectively placed on three and four supports and also contacted respectively with three and four projected parts (the dotted-line part at the leading end of the support shows a situation where the base plate is supported from below by the support).

FIG. 6(a) is a plan view where, among four sides of the horizontally surrounding part, a projected part is contacted with one side and the inner wall of the frame body is contacted with the other three sides, and FIGS. 6(b) and (c) are respectively a plan view and a perpendicular side cross-sectional view where the inner wall of the frame body is contacted with all the four sides of the horizontally surrounding part. (However, FIG. 6(c) is a perpendicular side cross-sectional view along the direction A to A given in FIG. 6(b)), and it is noted that the dotted-line part at the leading end of the support in each figure shows a situation where the base plate is supported from below by the support).

FIGS. 7(a) and (b) are respectively a plan view and a perpendicular side cross-sectional view where the inner wall of the frame body is contacted with one side of the horizontally surrounding part and the projected parts are contacted with the other three sides (however, FIG. 7(b) is a perpendicular side cross-sectional view along the direction A to A given in FIG. 7(a)), FIG. 7(c) is a plan view for explaining a case where the inner wall of the frame body is contacted with two sides of the horizontally surrounding part and the projected parts are contacted with the other two sides, and FIG. 7(d) is a plan view where the inner wall of the frame body is contacted with three sides of the horizontally surrounding part and the projected part is contacted with the other side. (However, in the cases of FIGS. 7(a) and 7(b), the base plate is placed on four supports in a state of being connected to each other and two projected parts are partially perpendicular to the supports in the longitudinal direction and also partially in parallel therewith, in the case of FIG. 7(c), the base plate is placed on two supports and projected parts are perpendicular to the supports in the longitudinal direction, and in the case of FIG. 7(d), the base plate is placed on two supports in a state of being connected to each other and the projected parts are parallel to the longitudinal direction of the supports. It is noted that the dotted-line part at the leading end of each support and the dotted-line part inside the frame body in these figures show a situation where the base plate is supported by the supports and steps from below).

FIG. 8(a) shows a case where the plate is placed on two steps and the inner wall of the frame body is contacted with four sides of the horizontally surrounding part, FIG. 8(b) shows a case where the plate is placed on four steps and the inner wall of the frame body is contacted with four sides of the horizontally surrounding part (it is noted that the dotted-line part inside the frame body shows a state that the base plate is supported by the steps).

FIG. 9(a) shows a case where the support is a bolt and the projected part is a nut, FIGS. 9(b) shows a case where a collar part capable of freely sliding on the support is adopted as the projected part and a fixing bolt screwed into the collar part is used to select fixture or movement.

FIGS. 10(a) and 10(b) are side cross-sectional views of an embodiment where a contact side with respect to a horizontally surrounding part of the base plate at an intermediate portion of a support is parallel to the support or attaches a projected part partially perpendicular and also in parallel, and the support is fixed to the frame body or capable of moving freely. FIG. 10(a) shows a case where a bolt is screwed into the frame body, and FIG. 10(b) shows a case where the support is penetrated so as to slide on the frame body of the table and a fixing bolt screwed into the horizontal projected part is used to freely select fixture or movement.

FIG. 11(a) shows a case where a surface in contact with the projected part is perpendicular to the support in the longitudinal direction, FIG. 11(b) shows a case where a contact side of the projected part is parallel to the longitudinal direction of the support, and FIG. 11(c) shows a case where a contact side of the projected part is partially perpendicular to the longitudinal direction of the support (a part located outside the base plate is the perpendicular part) and also partially in parallel therewith.

FIG. 12(a) is a plan view and FIG. 12(b) is a perpendicular side cross-sectional view.

FIG. 13(a) shows a case where three locations are used to form the triangle and FIG. 13(b) shows a case where four locations are used to form the quadrangle in which in particular the center of gravity is present at an intersecting point of diagonal lines.

DESCRIPTION OF SYMBOLS

Figure 1A:
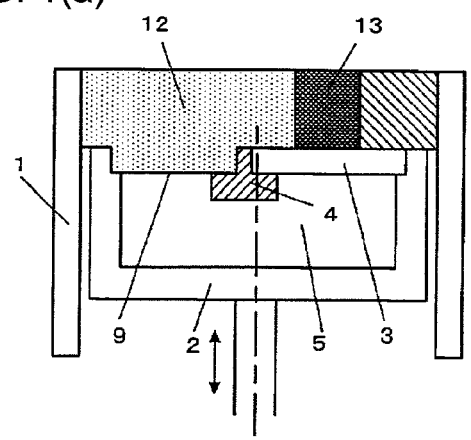
FIGS. 1(*a*)-1(*d*) are perpendicular side cross-sectional views showing a configuration of Example 1 where a powder supporting plate is used. In the drawing, FIGS. 1(*a*), (*b*), (*c*) and (*d*) indicate states that powder is allowed to fall from a base plate and the powder supporting plate, and the powder is retained inside a table and a frame body.

1: Shaping tank
2: Table
20: Insertion hole

21: Discharge opening
3: Base plate
31: Upper part of the base plate where powder is adopted
32: Lower metal plate of the base plate
4: Support and bolt as its embodiment
5: Projected part, and nut and collar part as its embodiment
6: Fixing bolt
7: Frame body
70: Insertion hole
71: Horizontal projected part
72: Both-side leg parts
8: Stopping rod or stopping bolt
9: Powder supporting plate
10: Opening/closing plate
11: Perpendicular support
12: Powder
13: Shaped article

DESCRIPTION OF PREFERRED EMBODIMENTS

According to the present invention, in a support installed in a projecting manner horizontally and inwardly toward the inside of a table 2 flush with a frame body 7 installed upright on the table 2 and/or the frame body 7, a base plate 3 is placed on a step portion which gives as a lower part an inner-direction part of the table on the frame body, and a horizontally surrounding part of the base plate 3 is contacted with a projected part provided on the support and projecting at least upward from the support and/or an inner wall of the frame body 7, thereby preventing the base plate 3 from moving horizontally.

The base plate 3 is supported by arranging three locations to give a surrounding state so that the center of gravity of the base plate 3 is inevitably located inside a region of the support and/or the step portion where the base plate is placed.

A specific explanation will be made as to the grounds for the above requirement. That is, powder 12 and a shaped article 13 loaded on the base plate 3 are kept equal in weight per unit area.

Figure 13A:
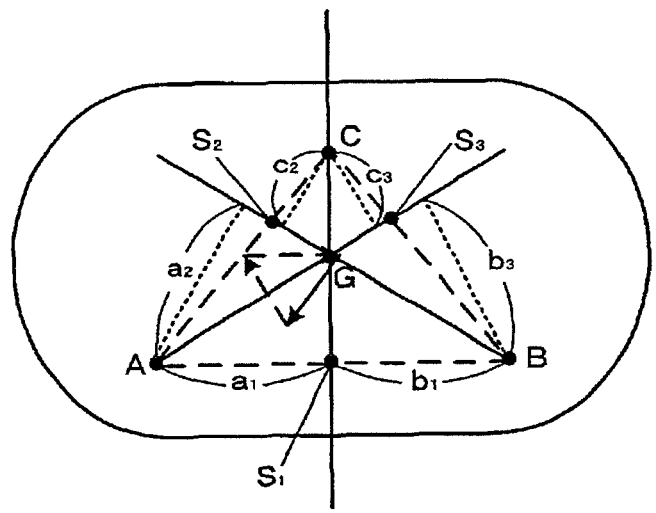
FIGS. 13(a) and 13(b) are plan views for explaining that a base plate can be supported by arrangement so that the center of gravity (G) of the base plate is present inside a triangle formed by three locations or a quadrangle formed by four locations inside a region of supports and/or step portions on which the base plate is placed.

In this case, for example, as shown in FIG. 13(a), where the center of gravity (G) of the base plate 3 is present inside a triangle ABC formed by three locations (A, B, C) and also where an intersecting point of a straight line CG obtained by extending the location of C and the center of gravity (G) with a straight line AB obtained by connecting the location of A and the location of B is given as $S_1$, both sides of a straight line $CGS_1$ are equal in weight to one-side parts of the powder 12, the shaped article 13 and the base plate 3. Gravity acting on each of the powder 12, the shaped article 13 and the base plate 3 on both sides is kept balanced on the basis of the straight line $CGS_1$. On the base plate 3, no rotational moment is generated which gives the straight line $CGS_1$ as a rotating center due to the gravity.

Herein, where drag forces for supporting a whole weight M at the location of A, the location of B and the location of C are respectively referred to as $M_A$, $M_B$, and $M_C$, a formula of $M_A+M_B+M_C=M$ is established.

On the other hand, where a distance between the straight line $CGS_1$ and the location of A and a distance between the straight line $CGS_1$ and the location of B are respectively given as $a_1$ and $b_1$, as described above, no rotational moment is generated. This means that a formula of $a_1M_A=b_1M_B$ is established.

Similarly, as shown in FIG. 13(a), where an intersecting point of an extension of a straight line BG with a straight line CA is given as $S_2$, and a distance between a straight line $BGS_2$ and the location of C and that between the straight line $BGS_2$ and the location of A are respectively given as $c_2$ and $a_2$, as with the straight line $CGS_1$, no rotational moment is generated which gives the straight line $BGS_2$ as a rotating center. Thus, a formula of $c_2M_C=a_2M_A$ is established.

Further, where an intersecting point of a straight line AG with a straight line BC is given as $S_3$ and a distance between a straight line $AGS_3$ and the location of B and that between the straight line $AGS_3$ and the location of C are respectively given as $b_3$ and $c_3$, a formula of $b_3M_B=c_3M_C$ is established.

On the basis of the above-described formulae, the following are obtained:

$$M_A=M/(a_1/b_1+a_2/c_2+1),$$

$$M_B=M/(b_1/a_1+b_3/c_3+1), \text{ and}$$

$$M_C=M/(c_2/a_2+c_3/b_3+1).$$

More specifically, where the center of gravity (G) of the base plate 3 is present inside the triangle ABC formed by the three locations (A, B, C), any one of $M_A$, $M_B$ and $M_C$ having a weight at the respective points of A, B and C is a positive value and not a negative value. Thus, the base plate 3 is supported stably without being accompanied by rotational moment.

The support and/or the step portion are in reality continued. Since three locations of A, B and C are not supported in an isolated manner, it is as a matter of course possible to support the base plate 3 stably where the center of gravity (G) of the base plate 3 is present inside the triangle ABC formed by the three locations (A, B, C).

An explanation will be made for a case where the center of gravity (G) of the base plate 3 is located inside a quadrangle formed by four locations inside a region of the support and/or the step portion. If the center of gravity (G) is located inside a triangle formed by three locations, among the four locations, as apparent from the explanation about three locations shown in FIG. 13(a), it is as a matter of course possible to support the base plate 3 stably.

Figure 13B:
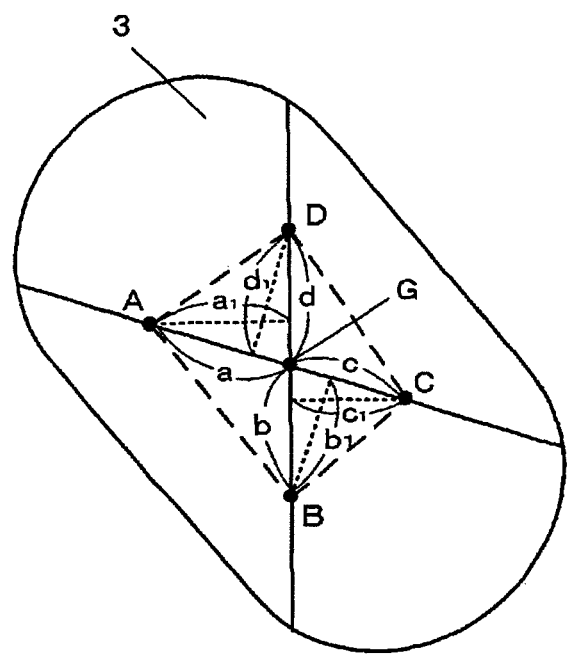

However, as shown in FIG. 13(b) in particular, where the center of gravity (G) of the base plate 3 is located inside the quadrangle ABCD formed by four locations (A, B, C, D) but the center of gravity (G) is present at an intersecting point (an intersecting point of the straight line AC with the straight line BD) of diagonal lines of the quadrangle ABCD, the center of gravity (G) is unable to locate inside any one of the triangles (triangles ABD, BAC, CBD and DAC) formed by three locations, among four locations. This needs particular consideration.

In FIG. 13(b), where drag forces supported by a whole weight M at the location of A, the location of B, the location of C and the location of D are respectively given as $M_A$, $M_B$, $M_C$ and $M_D$, and a distance between the location of the center of gravity (G) which is an intersecting point and the location of A, a distance between that and the location of B, a distance between that and the location of C, and a distance between that and the location of D are respectively given as a, b, c and d, a distance between the location of A and a diagonal line DGB and a distance between the location of C and the diagonal line DGB are respectively given as $a_1$ and $c_1$, and a distance between the location of B and a diagonal line AGC and a distance between the location of D and the diagonal line AGC are respectively given as $b_1$ and $d_1$, no rotational moment is generated, with each of the diagonal lines given as a rotating center. Therefore, the following formulae are established:

$$a_1M_A=c_1M_C \text{ and}$$

$$b_1 M_B = d_1 M_D.$$

Since the following formula is established:

$$a_1/a = c_1 c,$$

and the following formula is also established:

$$b_1/b = d_1 d,$$

the following formulae are finally established:

$$aM_A = bM_C$$

$$bM_B = bM_B.$$

As a matter of course, between each of the drag forces $M_A$, $M_B$, $M_C$, $M_D$ and the whole weight, the following formula is established:

$$M_A + M_B + M_C + M_D = M.$$

However, it is impossible to specify four drag forces, $M_A$, $M_B$, $M_C$, $M_D$ by referring only to the above three formulae.

On the assumption that the drag $M_A$ is not a positive value but a relationship of $M_A = 0$ is established, there is no way but to give $M_C = 0$ on the basis of the above formulae.

The drag forces $M_A$, $M_B$, $M_C$ and $M_D$, are common in that they correspond to the respective locations of A, B, C, and D and the weights equal to the surrounding unit areas thereof. Thus, on the assumption that a relationship of $M_A = M_C = 0$ is established, $M_B$ and $M_D$ are also inevitably supported in a similar manner and a relationship of $M_B = M_D = 0$ is established. In this case, however, it is impossible to keep the above fundamental formula that the sum of drag forces $M_A$, $M_B$, $M_C$, and $M_D$ is equal to the whole weight M.

Therefore, none of these drag forces $M_A$, $M_B$, $M_C$, and $M_D$ can be zero, and they must consequently be a positive value.

Thus, as shown in FIG. 13(b) in particular, the center of gravity (G) of the base plate 3 is not present inside any one of the triangles formed by the three locations. And, in such an arrangement that the center of gravity (G) is present inside a quadrangle formed by four locations, it is consequently possible to support the base plate 3 stably.

In the previously described basic configuration, in a region contacted with the projected part and/or the inner wall, such a state is always developed that any one of the crossing angles formed by individual normal lines from three or more contact locations adjacent to each other is less than 180 degrees, thereby preventing the base plate 3 from moving horizontally.

Figure 14:
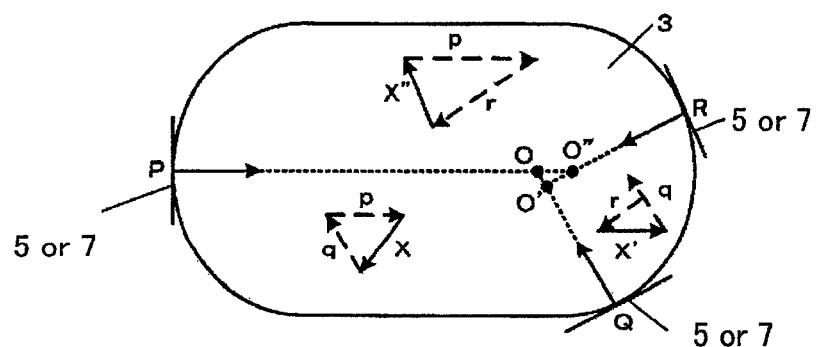
FIG. 14 is a plan view for explaining that at a region in contact with the projected part and/or an inner wall of the frame body, such a situation that any one of the crossing angles formed by individual normal lines from three contact locations adjacent to each other is smaller than 180 degrees is reliably realized, by which a drag force associated with the contact can resist a force resulting from a horizontal surface which attempts to move the base plate in all directions.

A description will be made as to grounds that contact locations in the above-described state are present particularly in three or more. For example, as shown in FIG. 14, in a case where three contact locations P, Q, and R are present in a horizontally surrounding part of the base plate, when an intersecting point formed by normal lines from the contact locations P and Q is given as O, if an angle POQ is smaller than 180 degrees, a force X in a direction heading for the location of P, the location of Q and a middle location therebetween from the intersecting point O is subjected to vector composition by both drag forces p and q heading for the normal lines from the location of P and the location of Q, thereby developing a state of being balanced with the force X. Thus, (a relationship of $X = \bar{p} + \bar{q}$ is established among vector quantities X, p, q) and it is possible to prevent the base plate 3 from moving by the force X.

It is noted that there are a variety of locations where the force X acts on the base plate 3 and the locations shall not be limited to the intersecting point O. Irrespective of any location subjected to the above action, a force balance is inevitably developed by the vector composition with the force X and the drag forces p and q.

Similarly, as shown in FIG. 14, a force X' in a direction heading for the location of Q, the location of R and a middle location therebetween from an intersecting point O' formed by individual normal lines from the location of Q and the location of R is subjected to vector composition by the respective drag forces q and r at the location of Q and the location of R, thereby developing a state of being balanced with the force X' (a state in which a relationship of $X' = \bar{q} + \bar{r}$ is established). A force X" in a direction heading for the location of R, the location of P from an intersecting point O" formed by normal lines from the location P and a middle location between the location of R and the location is subjected to vector composition by the respective drag forces r and q at the location of R and the location of P, thereby developing a state of being balanced with the force X" (a state in which a relationship of $X = \bar{r} + \bar{p}$ is established). Finally, it is possible to prevent the base plate 3 from moving horizontally.

In FIG. 14, an explanation is made for three contact locations in particular. In the case of four contact locations, where any one of the crossing angles formed by normal lines from contact locations adjacent to each other is smaller than 180 degrees, it is possible to provide drag forces capable of being balanced with respect to forces acting on the base plate 3 exactly in a similar manner.

Nevertheless, as long as the crossing angle is made smaller with an increasing number of contact locations, it is possible to develop a balanced state stably by the drag forces.

In addition to the balance between the above-described acting forces and the drag forces, in the base plate 3, a horizontal rotational moment is developed in which the center of gravity of the powder 12, the shaped article 13 and the base plate 3 are given as rotating centers. On the assumption that the rotational moment is generated in such directions that run along contact surfaces at the above-described three or more contact locations, a case where the rotation cannot be prevented by the drag forces is developed (for example, a case where a frictional force resulting from the contact is unable to prevent the rotational force based on the rotational moment). However, in reality, there is no chance of developing the rotational moment along three or more contact surfaces. Thus, it is in principle not necessary to consider this point.

As apparent from the previously described basic configuration, an aspect of placing the base plate 3 is provided in three patterns, that is, where the base plate 3 is placed only on a support, where it is placed on a support and a step portion and where it is placed only on a step portion. An aspect of being in contact with a horizontally surrounding part of the base plate 3 is provided in patterns where the base plate 3 is contacted with only a projected part, where it is contacted with a projected part and an inner wall of a frame body 7 and where it is contacted with only an inner wall of the frame body 7.

However, where the base plate 3 is placed on a step portion, it is not necessary that the base plate 3 is placed on a support having a projected part in addition to the step portion. Consequently, the inner wall of the frame body 7 is contacted with the horizontally surrounding part of the base plate 3.

Conventionally, the above contact is carried out by interposing a heating plate (heater) or a cooling plate (cooler) between the table 2 and the base plate 3. In the previously described basic configuration, as a matter of course, it is possible to interpose a heating plate (heater) or a cooling plate (cooler) between the support of the base plate 3 and/or the step portion (not illustrated). Any of them can be selected according to molding conditions.

Various embodiments are available where the base plate 3 is placed only on the support.

Figure 5A:
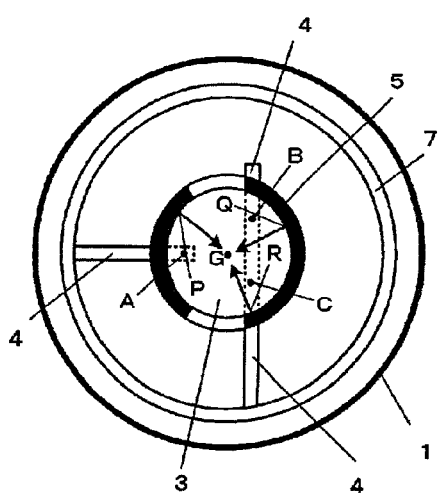
FIGS. 5(a)-5(d) are plan views showing an embodiment in which the base plate is placed on supports.

FIG. 5(a) shows an embodiment where at least two supports are installed in a projecting manner. These two supports are not in parallel but kept perpendicular to each other. Further, since it is possible to set a triangle ABC capable of arranging the center of gravity (G) so as to be located thereinside as a supporting location by placing the base plate 3, the base plate 3 can be supported stably.

In an embodiment shown in FIG. 5(a), a circular base plate 3 is placed and also a contact surface of a projected part is formed in a circular-arc shape. Also, as shown in FIG. 5(a), a state is developed that any one of the crossing angles formed by individual normal lines from three contact locations P, Q, and R adjacent to each other is smaller than 180 degrees. Therefore, as already explained, it is possible to prevent the base plate 3 from moving horizontally.

Figure 5B:
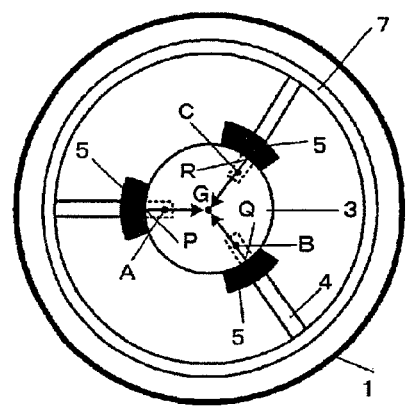

Similar to FIG. 5(a), FIG. 5(b) shows an embodiment where the circular base plate 3 is placed on three supports and a circular-arc-shaped projected part provided on each of the supports is contacted with a horizontally surrounding part of the base plate 3.

In the embodiment shown in FIG. 5(b) as well, there is present a triangle ABC capable of arranging the center of gravity (G) so as to be located there inside, thereby it is possible to support the base plate 3 stably. Further, any one of the angles formed by three normal lines from the three contact locations P, Q, and R which are adjacent to each other is smaller than 180 degrees, thus making it possible to prevent the base plate 3 from moving horizontally.

In the circular base plate 3 shown in FIG. 5(a) and (b), on the assumption that a horizontal rotational moment is generated where the center of gravity location (G) of the base plate 3 is given as a center, a case where contact at three contact locations P, Q, and R is unable to prevent the rotational moment is developed. However, as already pointed out, in practice, no such force that will cause the rotational moment can be generated.

Figure 11A:
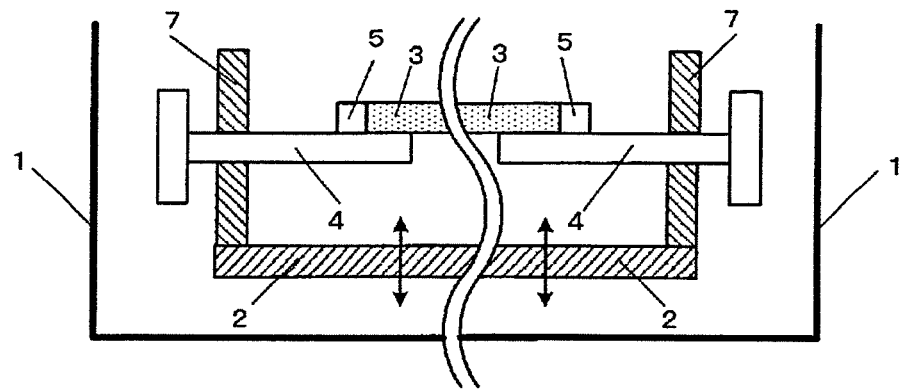
FIGS. 11(a)-11(c) are perpendicular side cross-sectional views for explaining a state that a support is provided with a projected part which projects upward. In this drawing.
Figure 11B:
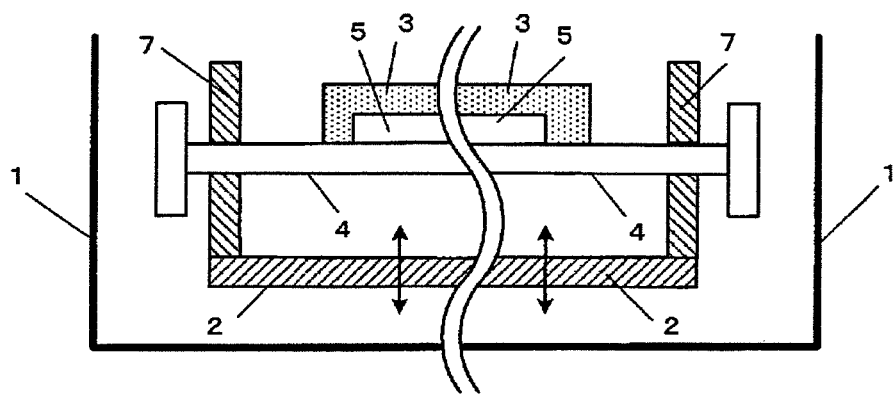
Figure 11C:
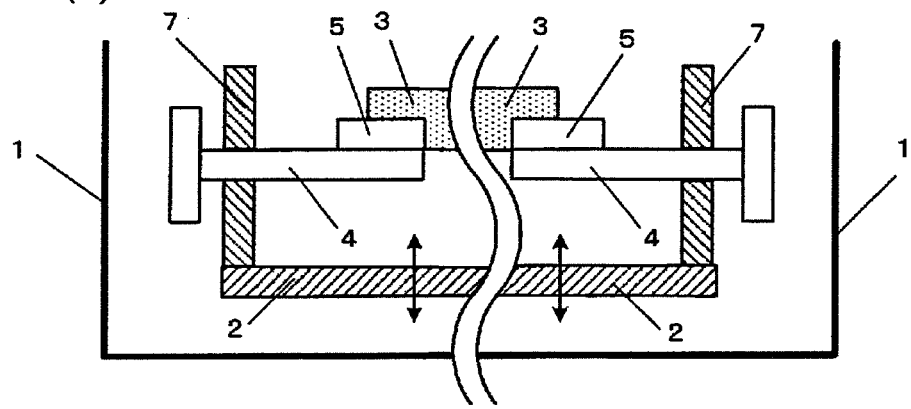

As will be explained in the following embodiment, the base plate 3 is ordinarily in a rectangular shape. An appropriate selection can be made from an embodiment where, as shown in FIG. 11(a), a contact surface contact with each side of a horizontally surrounding part of the rectangular base plate 3 at a projected part perpendicular to the longitudinal direction of a support, an embodiment where, as shown in FIG. 11(b), a contact surface contact with each side at a projected part parallel to the longitudinal direction of a support, and an embodiment where, as shown in FIG. 11(c), a contact surface contact with each side at a projected part which is partially perpendicular to the longitudinal direction of a support (a portion located outside from the base plate 3 indicates the perpendicular part) and also partially in parallel.

Figure 9A:
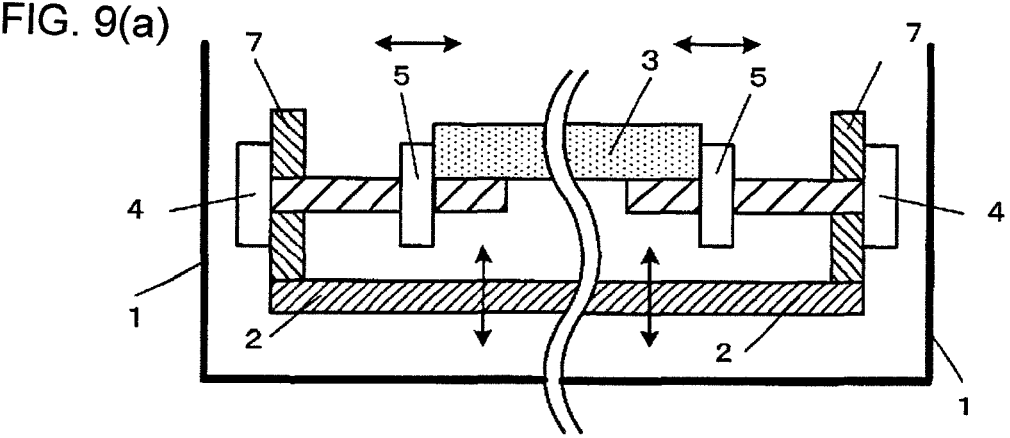
FIGS. 9(a) and 9(b) are side cross-sectional views of an embodiment where a projected part whose contact side with respect to the horizontally surrounding part of the base plate is perpendicular to a support or a projected part including the above perpendicular part may be selectively fixed or moved. In this drawing.

The projected part 5 is required to project at least in an upward direction, and this is because the projected part is required to contact with a horizontal outer circumferential part of the base plate 3 which is placed on the support 4. As the above-described projected part 5, such an embodiment such as a nut 5 and a collar part 5 which will be described later in FIGS. 9(a) and (b) that projects to the support 4 in the longitudinal direction of the entire circumference is, as a matter of course, adoptable, for example.

Figure 5C:
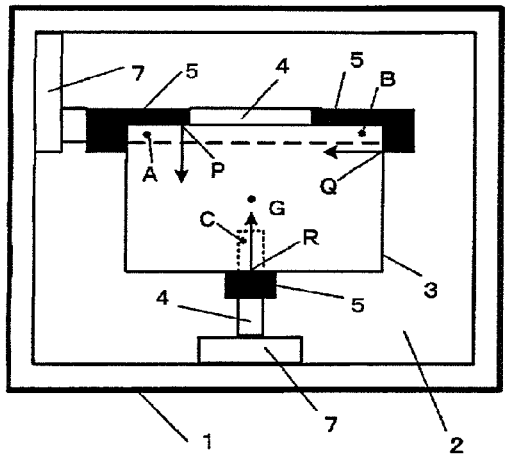

FIG. 5(c) shows an embodiment where a rectangular base plate 3 is placed on three supports 4. A contact surface of one projected part is perpendicular to the longitudinal direction of a support, while contact surfaces of the other two projected parts are partially perpendicular to and also parallel with the longitudinal direction of the support, thereby these surfaces are made to contact with two corners on the base plate 3.

In the embodiment shown in FIG. 5(c) as well, there is present a triangle ABC capable of arranging the center of gravity (G) so as to be located inside, thus making it possible to support the base plate 3 stably. Further, any one of crossing angles formed by individual three normal lines from three locations P, Q, and R adjacent to each other is smaller than 180 degrees. Therefore, as a matter of course, it is possible to prevent the base plate 3 from moving horizontally.

Figure 5D:
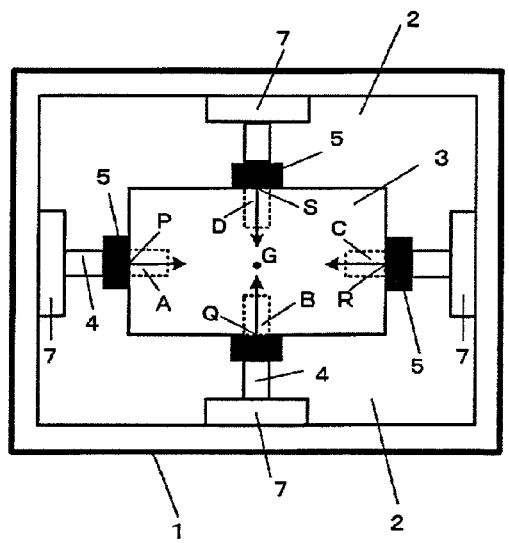

FIG. 5(d) shows an embodiment where the rectangular base plate 3 is placed on four projected parts and any one of the contact surfaces of these four projected parts is perpendicular to the longitudinal direction of the base plate 3.

In the embodiment shown in FIG. 5(c) as well, there is present a quadrangle ABCD capable of arranging the center of gravity (G) so as to be located inside, thus making it possible to support the base plate 3 stably. Further, any one of the crossing angles formed by individual four normal lines from four locations P, Q, R, S adjacent to each other is smaller than 180 degrees (in reality, about 90 degrees). Therefore, as a matter of course, it is possible to prevent the base plate 3 from moving horizontally. (All of the following embodiments show a state that the rectangular base plate 3 is placed. It is apparent that there are inevitably present four locations placed in a surrounding manner by arranging the center of gravity (G) so as to be located inside a region where the base plate 3 is placed, four contact locations adjacent to each other are present at supporting sites, and any one of the crossing angles formed by individual normal lines from the contact locations is smaller than 180 degrees (in reality, about 90 degrees). Thus, no explanation will be made for these matters.)

Apart from the embodiment shown in FIG. 5(d), such an embodiment to be described later can be, as a matter of course, realized that a horizontally surrounding part of the rectangular base plate 3 and the vicinity thereof are placed on supports and also contact surfaces are kept parallel to the longitudinal direction of the supports (the embodiment is not illustrated).

In the respective embodiments shown in FIGS. 5(a), (b), (c) and (d), the base plate 3 is placed on two or four supports 4. As a matter of course, it is possible to increase the number of supports depending on the weight of the powder 12 and that of the shaped article 13.

It is noted that the frame body 7 installed upright on the table 2 may be selected from an integrated configuration as shown in FIGS. 5(a) and (b) and a separated configuration so as to correspond to each of the supports 4 as shown in FIGS. 5(c) and (d).

Although, there is no particular restriction to an embodiment of the base plate 3, a rectangular base plate as shown in FIGS. 5(c) and (d) (in particular, in a square base plate) is ordinarily adopted, and rarely is there an embodiment where a circular base plate is adopted as shown in FIGS. 5(a) and (b).

Figure 6A:
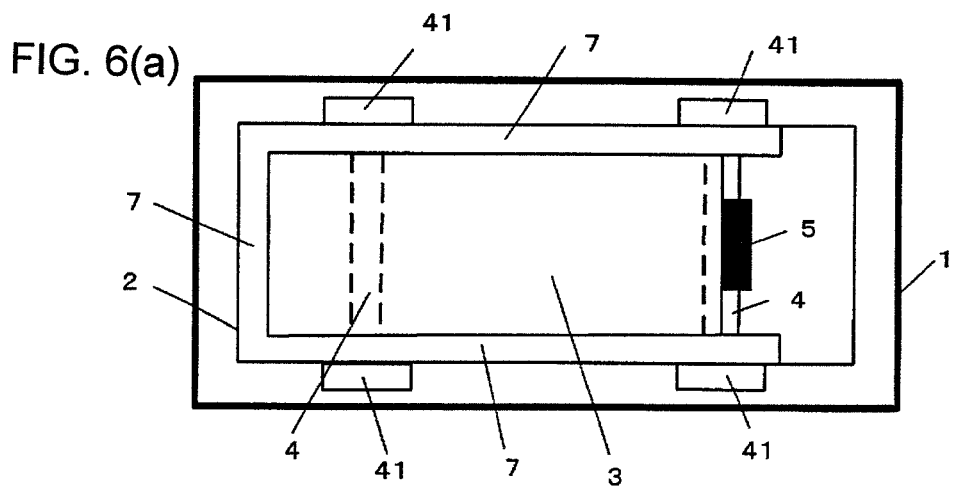
FIGS. 6(a)-6(c) explain embodiments where a rectangular base plate is placed on supports.
Figure 6B:
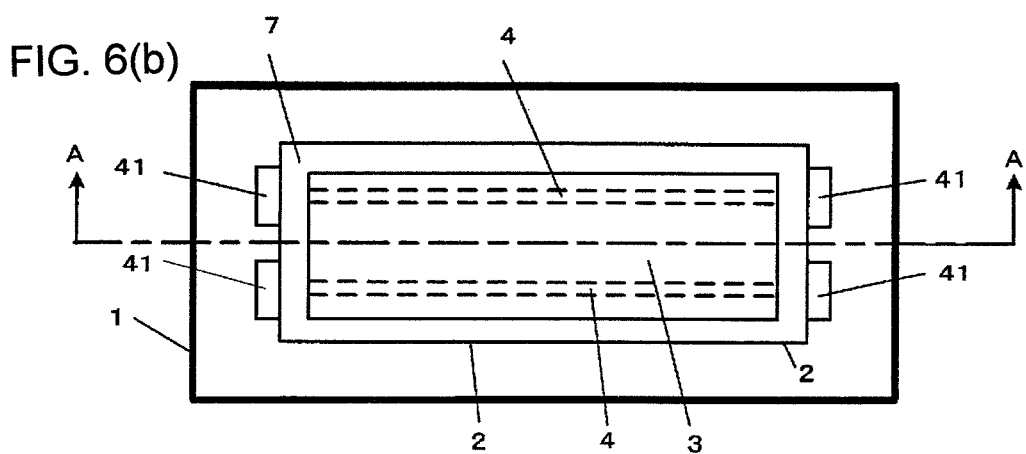
Figure 6C:
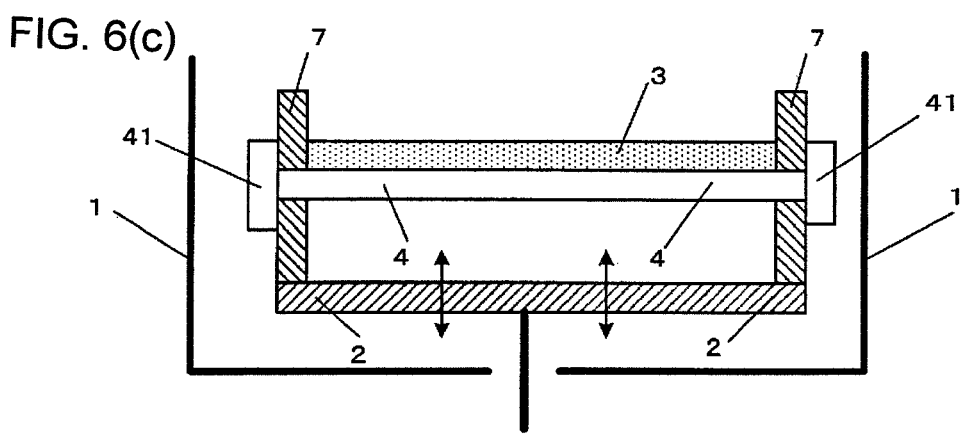

FIGS. 6(a)-6(c) show an embodiment where the rectangular base plate 3 is placed on supports and contact with respect to the horizontally surrounding part of the base plate 3 involves the inner wall of the frame body 7.

Among these embodiments, FIG. 6(a) which is a plan view shows an embodiment where the base plate 3 is placed on four supports which are opposed and also connected to each other and a contact surface is contacted with the horizontally surrounding part of the base plate 3 made up of four sides, that is, one projected part parallel to the longitudinal direction of the support and three inner walls. FIG. 6(b) which is a plan view and FIG. 6(c) which is a perpendicular side cross-sectional view show an embodiment where the base plate 3 is placed on four supports which are connected to each other and the horizontally surrounding parts made up of four sides of the base plate 3 are all contacted with the inner walls of the frame body 7 (a perpendicular cross-sectional view corresponding to FIG. 6(*a*) is omitted here because the view will be easily understandable by comparison with FIG. 6(*c*) and also by referring to perpendicular cross-sectional views shown in FIG. 7(*b*), FIG. 9(*a*), (*b*), and FIGS. 10(*a*) and (*b*) to be described later).

As a matter of course, the embodiments shown in FIGS. 6(*a*), (*b*) and (*c*) also realize a state that the base plate is placed stably and a state that the base plate can be prevented from moving horizontally.

FIGS. 7(*a*)-7(*d*) show an embodiment where the rectangular base plate 3 is placed on supports and step portions.

Then, FIGS. 7(*a*) and (*b*) show an embodiment where the base plate 3 is placed on two supports which are opposed and connected to each other and one step portion. FIGS. 7(*c*) and (*d*) show respectively an embodiment where the base plate 3 is placed on two supports which are connected to each other and two step portions which are faced with each other and an embodiment where the base plate 3 is placed on two supports which are opposed and connected to each other and three step portions which are adjacent to each other (perpendicular side cross-sectional views corresponding respectively to FIGS. 7(*c*) and (*d*) are omitted here because they will be easily understandable from FIG. 7(*b*) or FIGS. 9(*a*) and (*b*) and FIGS. 10(*a*) and (*b*) to be described later).

Normally, a step portion is used when a wider base plate is placed, further, as already described, an inner wall adjacent to a step portion on which the base plate 3 is placed contacted with a horizontally surrounding part of the base plate 3, therefore, the step portion is able to support the base plate 3 stably and also plays a meaningful role in terms of design.

In the above-described embodiments, the number of step portions is ordinarily limited to one to three, while the number of supports is not limited in particular.

The number of necessary supports tends to decrease with an increase in the number of step portions.

In FIGS. 7(*a*) and (*b*), a projected part a contact surface of which is partially perpendicular to and also parallel to the longitudinal direction of a support is adopted. In FIGS. 7(*c*) and (*d*), respectively adopted are a projected part a contact surface of which is perpendicular to the longitudinal direction and a projected part a contact surface of which is parallel to the longitudinal direction. The form of the contact surface of the projected part may be appropriately selected depending on the arrangement state of the support.

Figure 8A:
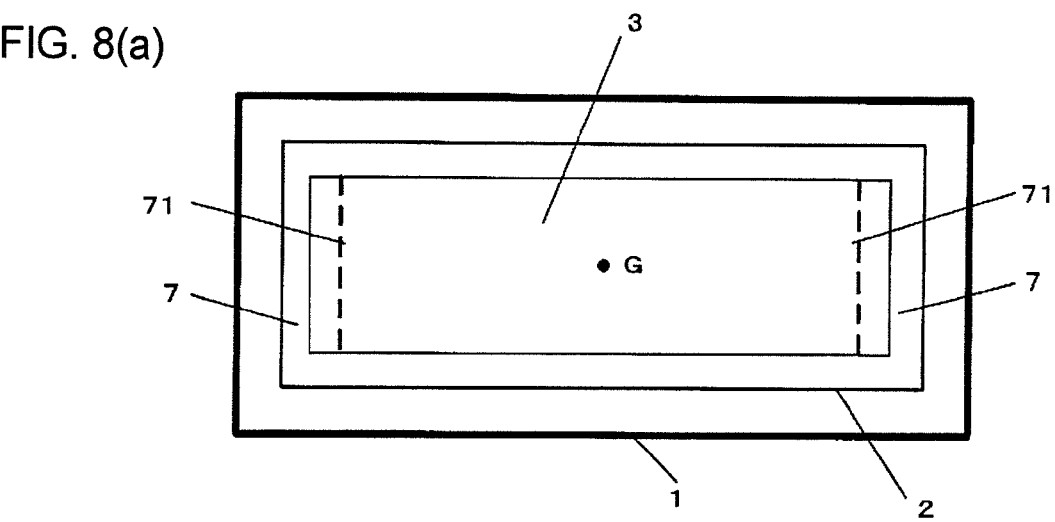
FIGS. 8(a) and 8(b) are plan views showing an embodiment where a rectangular base plate is placed on step portions.
Figure 8B:
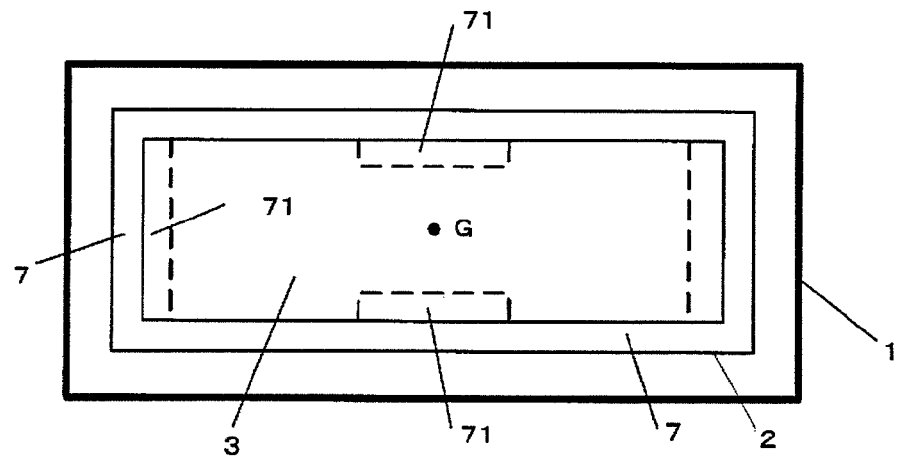

FIG. 8 shows an embodiment where a rectangular base plate 3 is placed only on step portions.

More particularly, FIG. 8(*a*) shows an embodiment where the base plate 3 is placed on two step portions which are faced with each other and also four sides of a horizontally surrounding part are actually all contacted with inner walls. FIG. 8(*b*) shows an embodiment where the base plate 3 is placed on step portions and also contacted with four inner walls.

In these embodiments, a stable placing state and a contacting state of the base plate 3 can be realized without being placed on supports.

In the embodiments shown respectively in FIG. 5(*d*) and FIG. 7(*b*), where the contact surface of the projected part is perpendicular to the longitudinal direction of a support, and in the embodiments as shown in FIGS. 5(*a*) and (*b*), the contact surface includes the above-described perpendicular portion, it is possible to adopt an embodiment in which a projected part 5 may be selectively moved along each of the supports 4 or fixed.

Figure 9B:
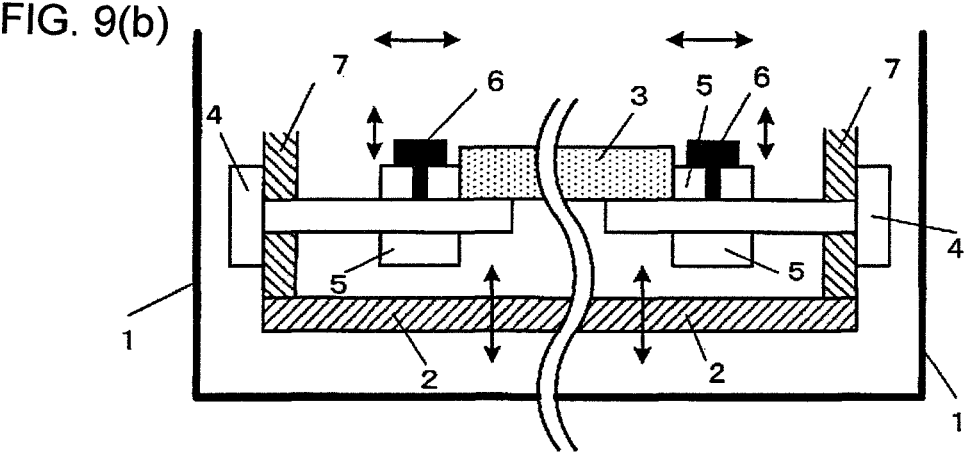

As these embodiments, as shown in FIG. 9(*a*), a configuration is preferably adopted in which a bolt 4 is used in place of the support 4 and a nut 5 is used in place of the projected part, and as shown in FIG. 9(*b*), a configuration is adopted in which a collar part 5 freely slides in the longitudinal direction on the support 4 in place of the projected part 5, a fixing bolt 6 is screwed into the collar part 5 in a direction perpendicular to the longitudinal direction thereof and the leading end of the fixing bolt 6 is able to contact with the longitudinal direction of the surrounding part.

In these embodiments, the location of the nut 5 shown in FIG. 9(*a*) and the location of the collar part 5 shown in FIG. 9(*b*) are adjusted in the horizontal direction and respectively fixed at predetermined locations of the bolt 4 and the support 4, thus making it possible to handle base plates 3 in various shapes and dimensions. It is also possible to adjust the location of the base plate 3 in the horizontal direction.

In the embodiments respectively shown in FIG. 6(*a*) and FIG. 7(*d*), where a contact surface of the projected part is parallel to the longitudinal direction of a support and in the embodiments respectively shown in FIG. 5(*c*) and FIG. 7(*a*), where the contact surface is perpendicular to and also partially parallel to the longitudinal direction of a support, such an embodiment is also adoptable in which the support 4 having the projected part fixed at an intermediate portion is selectively fixed to the frame body 7 or moved.

As the above-described embodiment, preferably adopted are a configuration as shown in FIG. 10(*a*) in which the bolt 4 is screwed into the frame body 7, and a configuration as shown in FIG. 10(*b*) in which the support 4 penetrating the frame body 7 is allowed to freely slide on the frame body 7 and on a horizontal projected part 71 of the frame body 7, in the horizontal projected part 71, a fixing bolt 6 is screwed in a direction perpendicular to the longitudinal direction of the support 4, and the leading end of the bolt 6 is able to contact with the longitudinal surrounding part. (It is noted that FIG. 10(*a*) shows a case where the contact surface of the projected part is in parallel and FIG. 10(*b*) shows a case where the projected part is in contact partially perpendicularly and also partially in parallel.)

In the above embodiments as well, the locations of the bolt 4 and the support 4 respectively shown in FIG. 10(*a*) and in FIG. 10(*b*) can be adjusted from the outside, thus making it possible to respond to base plates 3 in various shapes and dimensions and to adjust the location of the base plate 3 in the horizontal direction.

As shown in FIG. 10(*a*), where a bolt 4 is used in place of the support, the bolt 4 moves rotationally in a direction in which the bolt is projected. Therefore, such a configuration is preferably adopted for a projected part into which the bolt 4 is screwed to keep a state that the upper side of the bolt is installed in a projecting manner with respect to the base plate 3.

In the embodiments shown in FIG. 6(*b*) and FIGS. 8(*a*) and (*b*), the support 4 is not required to have a projected part 5 since the base plate 3 is made to contact with the inner wall of the frame 7.

Since no projected part is needed and horizontally surrounding parts of the base plate 3 constantly contact with the inner walls of the frame body 7, this gives a deceptive impression that a base plate 3 in area larger than necessary would be required.

However, in the above-described embodiment, it is not always necessary to provide the base plate 3 larger in area.

Figure 12A:
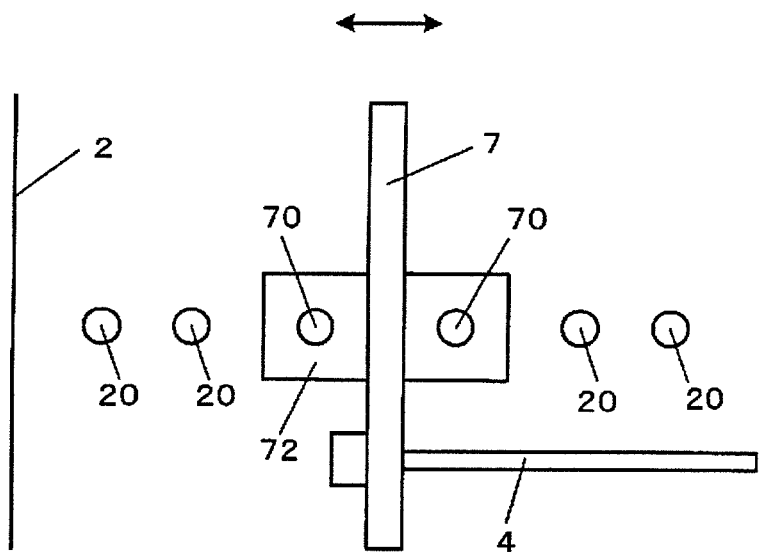
FIGS. 12(a) and 12(b) show an embodiment where the frame body is freely movable along the surface of the table. In this drawing.
Figure 12B:
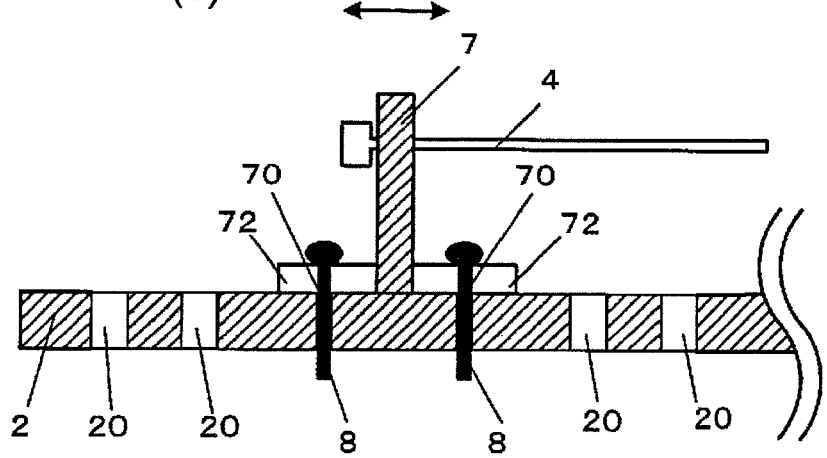

More specifically, as shown in FIG. 12, both-side leg parts 72 are installed in a projecting manner at the lower end of the frame body 7 in a direction in which the support 4 is installed in a projecting manner and also on the opposite side thereof, an insertion hole 70 is made on each of the both-side leg parts 72, a plurality of insertion holes 20 are made also on the table 2 depending on the direction in which each support 4 is installed in an projecting manner, stopping rods 8 or stopping bolts 8 are inserted through both insertion holes 20 and 70 locations for fixing individual support bodies 7 which are adjusted and selected by selecting said inserted locations, thereby making it possible to respond to base plates 3 in various shapes and dimensions and to adjust the location of the base plate 3 in the horizontal direction.

Powder 12 adoptable in the present invention includes metal powder, ceramic powder, resin-coated metal powder or ceramic powder 12 or resin-coated sand.

The base plate 3 used in the basic configuration is that in which the powder 12 is initially sprayed on the surface of the base plate 3 in the previously described step (a) and, the powder 12 must be adhered upon solidification of the powder 12 by sintering in the previously described step (b). As a material of the base plate 3, any material may be selected as long as it can be adhered.

Ordinarily, the same material as the previously described exemplified powder 12 is often adopted. In this case, the base plate 3 consequently configures the lowest end of a three-dimensional shaped product.

As a matter of course, in the basic configuration of the present invention and in the previously described individual embodiments, the step (a) is conducted in which the powder 12 is sprayed on the surface of the base plate to effect planarization, the sintering step (b) is conducted on the upper side of the base plate 3, and also the molding step (c) is conducted on the upper side, thereby producing a three-dimensional shaped product.

Hereinafter, an explanation will be made by referring to examples.

EXAMPLES

Example 1

Example 1 is characterized in that, as shown in FIG. 1, a powder supporting plate 9 is installed at a region with which a horizontally surrounding part of a base plate 3 does not make contact and on a frame body 7 with which the horizontally surrounding part does not make contact among supports.

Figure 1B:
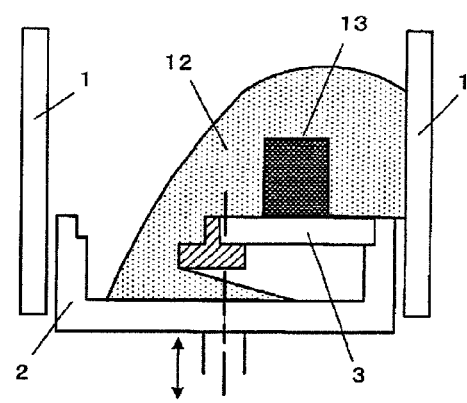
Figure 1C:
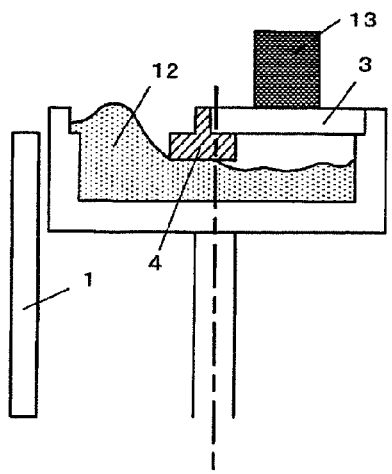

In Example 1, as shown in FIG. 1(b), the powder supporting plate 9 is removed from the state shown in FIG. 1(a), thereby developing states in which powder 12 is loaded within a space formed by a table 2 and the frame body 7 as shown in FIGS. 1(c) and (d). Then, the table 2 is moved upward, thus making it possible to discharge the powder 12 outside a container.

Example 2

Figure 2:
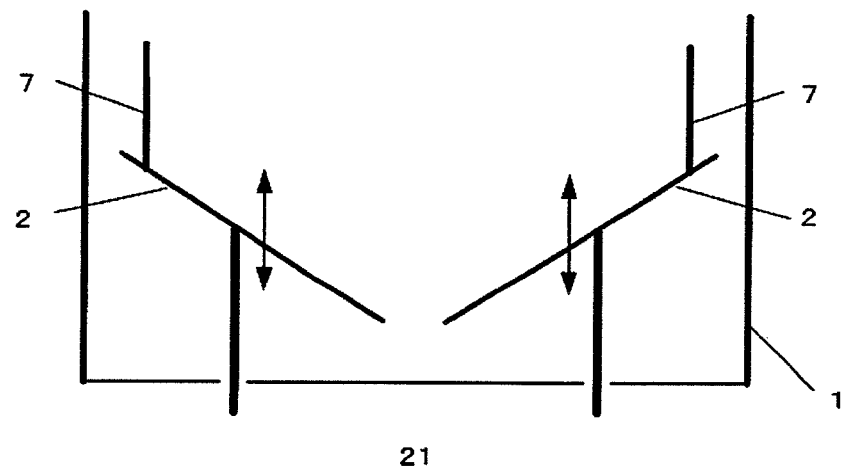
FIG. 2 is a perpendicular cross-sectional view showing a configuration of the table of Example 2 (a support or a projected part is not illustrated here).
Figure 7A:
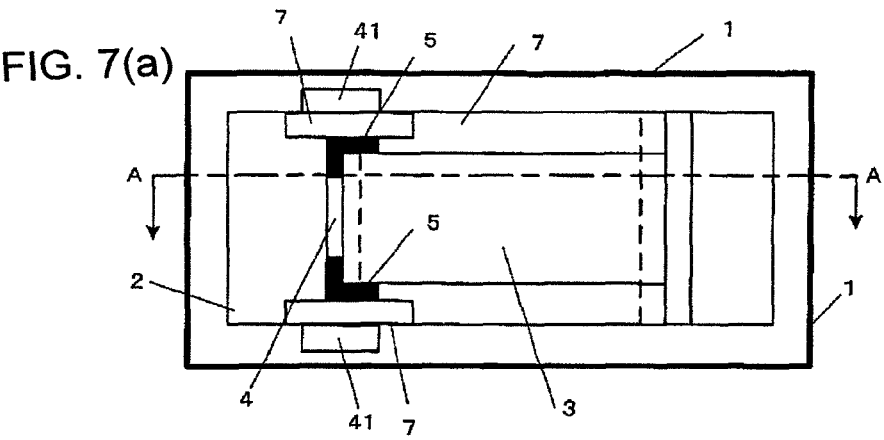
FIGS. 7(a)-7(d) show embodiments where a rectangular base plate is placed on supports and step portions of the frame body.
Figure 7B:
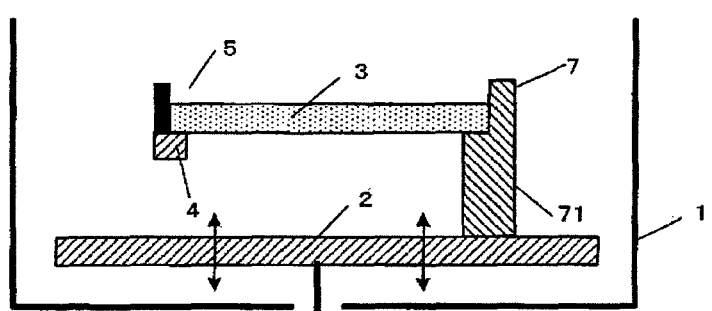
Figure 7C:
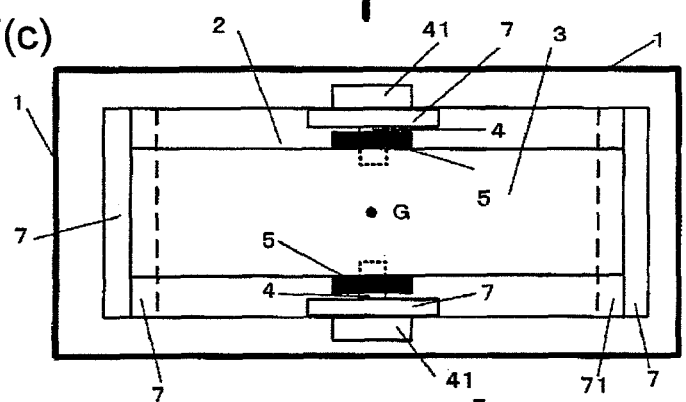
Figure 7D:
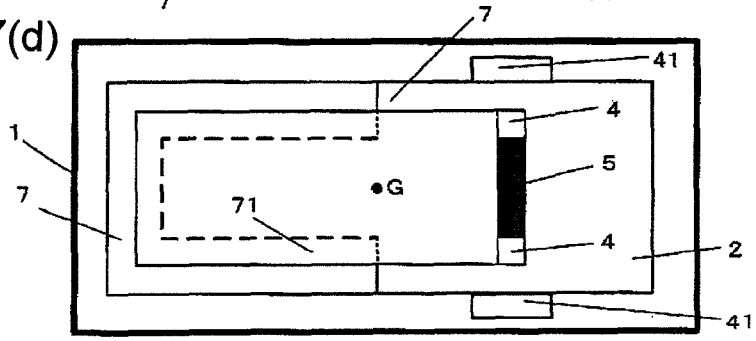

Example 2 is characterized in that, as shown in FIG. 2, on the table 2, an inclined state sequentially lowering at a whole region inside a location supporting the frame body 7 or at a region further inside away from the location is formed, and a discharge opening 21 is provided at the lower end in the inclined table for discharging the powder 12 which has not been sintered.

Where the powder 12 is loaded on the table 2 and the surface of the base plate 3 (for example, embodiments shown in FIGS. 5(a), (b), and (c), FIG. 6(a), FIGS. 7(a), (b), (c), and (d)) and where loaded on the surface of the base plate 3 (for example, embodiments shown in FIG. 6(b) and FIGS. 8(a) and (b)), all the powder 12 is not necessarily subjected to sintering.

Further, as shown in Example 1, as a matter of course, the powder 12 remaining on the powder supporting plate 9 is not subjected to sintering and shaping.

In this case, after the shaped article 13 is taken out from the table 2 together with the base plate 3, the powder 12 which has not been sintered remains consequently at the lower part of the table 2.

In Example 2, the remaining powder 12 lowers along the lower part of the inclined table and can be discharged through an opening located at the lowest part into the lower part of a shaping tank 1. Then, it is possible to reuse the powder 12.

A region in which the above inclined state is provided may include not only a whole region inside a location at which the frame body 7 is installed upright but also a whole region further inside away from the location. This is because in the embodiments shown in FIG. 6(b) and FIGS. 8(a) and (b), where a location for fixing the frame body 7 can be selected depending on the direction in which the support 4 contact as shown in FIG. 12, it is necessary that the table 2 is in a planar shape from a location where the frame body 7 is installed in a projecting manner to a predetermined inside region.

Example 3

Figure 3:
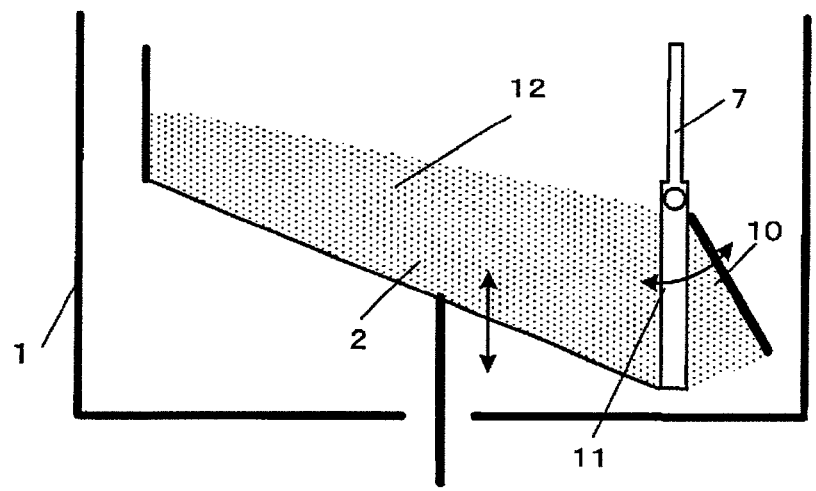
FIG. 3 is a perpendicular cross-sectional view showing a configuration of the table of Example 3 (the support or the projected part is not illustrated here).

As shown in FIG. 3, Example 3 is characterized in that, on the table 2, an inclined state sequentially lowering from one end to the other end which are faced with each other at a whole region inside a location for supporting the frame body 7 or at a region further inside away from the location, the frame body 7 is supported via two perpendicular supports 11 at the other end, and between the two perpendicular supports 11, provided is an opening/closing plate 10 capable of rotationally moving either the upper end position sandwiched by the two perpendicular supports 11 or these two perpendicular supports 11.

Similar to Example 2, also in Example 3, the powder 12 which has not been sintered or shaped is allowed to fall on the table 2 and the opening/closing plate 10 located between the perpendicular supports 11 is opened, thus making it possible to discharge the powder 12 from the surface of the table 2 to the outside. Then, similar to Example 2, it is possible to discharge the powder 12 to the outside effectively and reuse the powder 12. (It is noted that FIG. 3 shows a state that the opening/closing plate 10 moving rotationally is kept opened at the upper ends of two perpendicular supports 11 but at a stage where shaping is performed, as a matter of course, the opening/closing plate 10 is located between the perpendicular supports 11 and kept closed.)

In Example 3 as well, a region having the inclined state includes a whole region further inside away from a location where the frame body 7 is installed upright. The grounds thereof are the same as that described in Example 2.

Example 4

Figure 4:
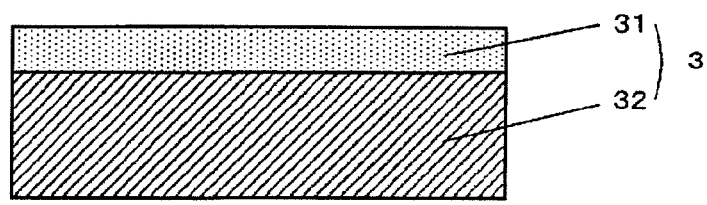
FIG. 4 is a perpendicular cross-sectional view showing a configuration of the base plate of Example 4.

As shown in FIG. 4, Example 4 is characterized in that, a molded layer made of powder 12 which is the same material as the powder 12 forming a three-dimensional shaped product is firmly adhered on an upper part 31 of a metal plate 32 configuring a part of the base plate 3.

As described above, adopted is a material which is the same material as the powder 12 forming a three-dimensional shaped product on the metal plate 32. Thereby, upon solidification of the powder 12 in the sintering step (b), the powder 12 can be firmly adhered.

The molded layer forms the lowest layer of the three-dimensional shaped product and also cuts the metal plate 32 located at the lowest end after completion of shaping.

By this cutting, the metal plate 32 is able to form a part of the surface of the base plate 3 in a subsequent metal step.

Effects of the Invention

In the present invention, on the basis of the basic configuration, a frame body is interposed between a base plate and a table to form a vertical space there between, thermal conduction from the base plate to the table is prevented, a powder material can be efficiently adhered on the base plate, further, the base plate is easily placed on a support and/or a step portion without being accompanied by fixation of a bolt from the table side, and a horizontally surrounding part of the base plate contact with the projected part and/or an inner wall of the frame body, thereby preventing the base plate from moving horizontally, making it possible to install the base plate stably.

Further, where the base plate is installed as described above, it is not necessary to insert a bolt as described in Patent Document 1. Thus, where the base plate is used as a configuration part at the lower end of an object to be shaped, there is no chance that a hole remains due to insertion of the bolt. Further, since the vertical space is present between the table and the base plate, the need for facilities for cooling the base plate which has been heated on the table as disclosed in Patent Document 1 is eliminated.

Still further, in the configuration disclosed in Patent Document 1, the table is consequently required to be planar. However, in the above-described basic configuration, as described in Example 2 and Example 3, an inclined state is developed on the table, thus making it possible to adopt a configuration capable of easily discharging powder which has not been sintered.

The present invention is applicable to any and all configurations of an apparatus for producing a three-dimensional shaped product using a base plate.

What is claimed is:

1. An apparatus for producing a three-dimensional shaped product, comprising:
    a shaping tank,
    a vertically movable table in the shaping tank, the vertically movable table having an upper surface,
    a frame body installed upright on the table,
    a base plate which supports a metallic or non-metallic powder material, the base plate positioned above the upper side of the vertically movable table, the base plate having a lower surface supported on top of at least one of:
        at least one support projecting horizontally from the frame body, and
        at least one step portion of the frame body, in such a manner that a center of gravity of the base plate is present inside one of:
        a triangle formed by three locations, and
        a quadrangle formed by four locations inside a region defined by the respective ones of said at least one support and said at least one step portion, and
    a projected part which extends upwardly from each said support and contacts an outer circumferential wall of the base plate,
    wherein any angle at an intersection of crossing lines formed by lines normal to at least three contact points of the respective ones of said at least one projected part and at least one step portion is smaller than 180 degrees, thereby preventing the base plate from moving horizontally,
    wherein the following steps are sequentially repeated:
    spraying one of the metallic and non-metallic powder on a surface of the base plate, with the surface of the base plate having at least a material which can be adhered to the metallic or non-metallic powder upon solidification of the powder,
    subjecting an upper surface of the thus sprayed powder to planarization,
    irradiating one of electromagnetic waves and electron beams along a layer of the powder having a predetermined thickness to a region to be shaped which is located at an uppermost position, thereby forming a sintered layer, and
    cutting at least one of an end part and upper surface where sintering has been performed to effect molding.

2. The apparatus for producing a three-dimensional shaped product according to claim 1, wherein
    the base plate is placed on at least two said supports alone and the outer circumferential wall of the base plate is contacted with at least two said projected parts.

3. The apparatus for producing a three-dimensional shaped product according to claim 2, wherein
    the base plate is circular and the lower surface of the base plate is placed on the at least two supports, and a contact surface of the projected part has a circular-arc shape along the circular base plate.

4. The apparatus for producing a three-dimensional shaped product according to claim 2, wherein
    the base plate is rectangular and the lower surface of the base plate is placed on at least three said supports and
    a said projected part has a contact surface one of:
        perpendicular to a longitudinal direction of a support and in contact with a rectangular side of the base plate, and
        partially perpendicular and also parallel to the longitudinal direction and in contact with a rectangular corner of the base plate.

5. The apparatus for producing a three-dimensional shaped product according to claim 1, wherein
    the base plate is rectangular and is placed on at least four said supports which are opposed and also connected to each other, and four sides of the horizontally surrounding part of the base plate are contacted with one of:
        both the projected part and an inner wall of the frame body, and
        only the inner wall of the frame body.

6. The apparatus for producing a three-dimensional shaped product according to claim 1, wherein
    the base plate is rectangular and the lower surface of the base plate is placed on the at least one support and the at least one step portion and also the outer circumferential wall of the base plate is contacted with the projected part and an inner wall of the frame body.

7. The apparatus for producing a three-dimensional shaped product according to claim 6, wherein
    one side of the outer circumferential wall of the base plate and an inner vicinity thereof are placed on step portions, another side opposing the one side and an inner vicinity thereof are placed on supports, the another side is contacted with a said projected part having a contact surface parallel to a longitudinal direction of the support, and other three sides are contacted with one of projected parts and the inner walls of the frame body.

8. The apparatus for producing a three-dimensional shaped product according to claim 1, wherein the base plate is rectangular, and one of:
  two sides of the rectangular base plate which face each other and an inner vicinity thereof, and
  four sides which face each other and the inner vicinity thereof,
are placed on step portions, and four sides of the horizontally surrounding part are contacted with an inner wall of the frame body.

9. The apparatus for producing a three-dimensional shaped product according to claim 8, wherein
  leg parts are installed in a projecting manner from both sides of and at a lower end of the frame body in a direction in which the at least one support is installed in a projecting manner on an opposite side of the frame body,
  an insertion hole is provided on each of the leg parts,
  a plurality of insertion holes are provided on the table in a direction in which each support is installed in a projecting manner,
  one of stopping rods and stopping bolts are inserted through these insertion holes, with inserted locations selected to adjust and select a location to which each frame body is fixed.

10. The apparatus for producing a three-dimensional shaped product according to claim 1, wherein
  a said projected part has a contact surface with respect to the outer circumferential wall of the base plate, which is perpendicular to a longitudinal direction of a respective said support and is adapted to be selectively one of fixed and moved.

11. The apparatus for producing a three-dimensional shaped product according to claim 10, wherein
  the at least one support includes a bolt and the at least one projected part includes a nut.

12. The apparatus for producing a three-dimensional shaped product according to claim 10, wherein
  the at least one projected part includes a collar part freely sliding in the longitudinal direction of the support, a fixing bolt is screwed into the collar part in a direction perpendicular to the longitudinal direction, and a leading end of the fixing bolt is adapted to contact the support.

13. The apparatus for producing a three-dimensional shaped product according to claim 1, wherein
  a said support to which a said projected part having a contact surface with respect to the outer circumferential wall of the base plate is one of:
    parallel to the support, and
    one of partially perpendicular and parallel to the support and is attached at a middle portion of the support, is selectively one of fixed and movable with respect to the frame body, and penetrates the frame body.

14. The apparatus for producing a three-dimensional shaped product according to claim 13, wherein
  a bolt is screwed into the frame body.

15. The apparatus for producing a three-dimensional shaped product according to claim 13, wherein
  the support is allowed to freely slide on the frame body and a horizontally projected part of the frame body, and
  a fixing bolt is screwed into the horizontally projected part in a direction perpendicular to the longitudinal direction of the support and also a leading end of the bolt is adapted to contact the longitudinal surrounding part.

16. The apparatus for producing a three-dimensional shaped product according to claim 1, wherein,
  a powder supporting plate is installed at a region with which the outer circumferential wall of the base plate does not contact and on a portion of the frame body in which the outer circumferential wall is not in contact with other supports.

17. The apparatus for producing a three-dimensional shaped product according to claim 1, wherein
  the table is formed in an inclined state sequentially lowering at a region one of:
    inside a location supporting the frame body and
    at a region further inside away from the location, and
  a discharge opening is provided at a lower end of the inclined table for discharging powder which has not been sintered.

18. The apparatus for producing a three-dimensional shaped product according to claim 1, wherein
  the table is formed in an inclined state sequentially lowering from one end to another end which face each other at a region one of:
    inside a location supporting the frame body and
    at a region further inside away from the location,
  the frame body is supported via two perpendicular supports at another end, and
  an opening/closing plate is provided between the two perpendicular supports and adapted to rotationally move one of:
    the upper end position sandwiched by the two perpendicular supports and
    these two perpendicular supports.

19. The apparatus for producing a three-dimensional shaped product according to claim 1, wherein
  a molded layer made of powder which is the same material as the powder forming a three-dimensional shaped product is firmly adhered on an upper part of a metal plate which configures a part of the base plate.

\* \* \* \* \*